March 13, 1928. 1,662,598
F. H. BIERMAN
CLUTCH AND CLUTCH ACTUATING MECHANISM
Filed Jan. 15, 1927
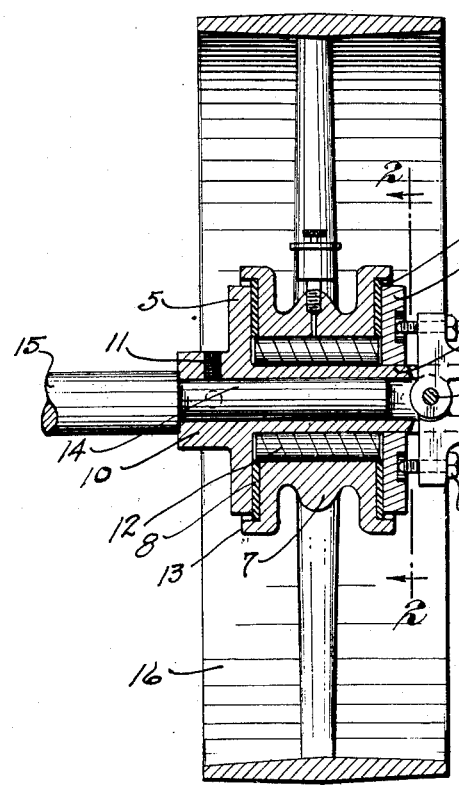
Inventor
Frank H. Bierman
By his Attorneys Patented Mar. 13, 1928.

1,662,598

UNITED STATES PATENT OFFICE.

FRANK H. BIERMAN, OF MINNEAPOLIS, MINNESOTA.

CLUTCH AND CLUTCH-ACTUATING MECHANISM.

Application filed January 15, 1927. Serial No. 161,318.

My invention has for its object to provide an extremely simple and highly efficient clutch and clutch-actuating mechanism, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a view principally in longitudinal central section showing one form of the invention embodied in a wheel and shaft;

Fig. 2 is a fragmentary detail view, with some parts sectioned on the line 2—2 of Fig. 1;

Fig. 3 is a detail view, with some parts sectioned on the line 3—3 of Fig. 1 with some parts broken away; and Fig. 4 is a side elevation of the parts shown in Fig. 3.

The improved clutch, as shown, comprises axially spaced clutch plates 5 and 6, a cooperating hub 7, and interposed friction discs 8. Said clutch plate 5 is integrally formed with the inner end of a tubular shaft 9, axially aligned therewith and has on its outer face a hub 10 in which are mounted a plurality of attaching set screws 11. The clutch plate 6 is loosely mounted on the tubular shaft 9 for axial adjustment toward and from the clutch plate 5 and the clutch hub 7 is journaled on said shaft between the clutch plates 5 and 6 with a roller bearing 12 interposed therebetween. The clutch discs 8 are loose and of the dry type.

Formed with the ends of the hub 7, at the perimeter thereof, are reversely extended annular flanges 13 which loosely surround the clutch plates 5 and 6, cover the joints therebetween, and hold the clutch discs 8 against radial shifting movement.

The tubular shaft 9 is telescoped onto the reduced end extension 14 of a shaft 15 until stopped by the shoulder therebetween, and secured for rotation therewith by the set screws 11. By reference to Fig. 1 it will be noted that the reduced shaft extension 14 is of such length as to extend substantially through the clutch, and the tubular shaft 9 extends materially outward of the clutch. Formed with the clutch hub 7 is a wheel 16 which, as shown, is a pulley but may be a sprocket wheel, gear or the like.

Referring now in detail to the clutch-actuating mechanism, the numeral 17 indicates a pair of bell-crank levers fulcrumed on a diametrically extended pin 18 in the tubular shaft 9 and work in a pair of diametrically opposite longitudinally extended slots 19 in said shaft. The long arms of the bell-crank levers 17 extend substantially parallel to the axis of the shaft 9 and the short arms thereof extend radially outward of said shaft and are spaced from the outer face of the clutch member 6. Bearing screws 20 have threaded engagement with the short arms of the bell-crank levers 17, extend into recesses in the outer face of the clutch plate 6 and impinge against said plate. Lock nuts 21 are applied to the outer ends of the screws 20 for holding the same where set in the bell-crank levers 17.

For operating the bell-crank levers 17 to axially move the clutch plate 6 toward the clutch plate 5 for clamping said plates onto the clutch hub 7 with the friction discs 8 interposed therebetween, a plunger 22 is mounted in the outer end portion of the tubular shaft 9 for compound axial and turning movements. The diameter of the inner end portion of the plunger 22 is reduced to afford a cylindrical section 23 with which the bell-crank levers 17 engage when the plunger 22 is retracted and the clutch neutral. Said plunger 22, outward of its section 23, is tapered to the body thereof to afford a cam-acting section 24 arranged to engage the bell-crank levers 17, spread the long arms thereof, and thereby cause said levers to axially move the clutch plate 6 toward the clutch plate 5. Obviously, this cam section 24, when the plunger 22 is projected, causes a variable pressure to be applied to the bell-crank levers 17, for a purpose that will hereinafter appear.

A disc-like head 25 is swivelled to the plunger 22 outward of the tubular shaft 9 and is mounted in a sleeve-like bearing guide 26 for compound turning and axial movements. This bearing guide 26 has on its inner end a two-part collar 27 loosely swivelled in an annular channel 28 formed in the periphery of the tubular shaft 9. One member of the collar 27 is integrally formed with the bearing guide 26 and the other, or loose member thereof, which is visible from Fig. 1, is secured to the fixed member of said collar by bolts 29. Said head 25 is provided with a pair of diametrically extended cam studs 30 mounted in oblique cam slots 31 in the bearing guide 26.

To turn the head 25 in the bearing guide 26 and thereby cause its cam studs 30, acting in the cam slots 31, to impart an axial movement to the plunger 22, there is provided a depending hand lever 32 fulcrumed on a lug 33, on the under side of the bearing guide 26. A link 34 intermediately connects the lever 32 to an eye 35 on one of the trunnions 30. A depending handle 36 in the form of a rod, is attached to the bearing guide 26. As shown, the lower end of this handle 36 is anchored to a bearing 37 on the same machine or device, not shown, to which the clutch and clutch-actuating device is applied. The purpose of thus anchoring the handle 36 is to prevent the bearing guide 26 from turning on the hollow shaft 9. The handle 36, in some instances, however, may be left free and be manually held while the lever 32 is being operated to project or retract the plunger 22. When this handle 36 is loose, the same together with the lever 32 will hang down under the action of gravity, and thereby cause the bearing guide 26 to remain stationary and not turn with the hollow shaft 9.

As previously stated, when the clutch is neutral, the bell-crank levers 17 engage the reduced section 23 of the plunger 22 and the cam studs 30 are at the longitudinal centers of the cam slots 31, as shown in Figs. 1 and 4.

The length and taper of the plunger 22 may be varied to meet different requirements. For example, if it is desired to have an extremely fine adjustment of the clutch for varying the speed thereof, the plunger 22 may be longer and have a longer taper to cause the action upon the clutch plates to be more gradual. In this case, however, the movement of the plunger 22, head 25 and cam studs 30 would necessarily be greater to throw the clutch from neutral to operative position and, hence, in a neutral position, the cam studs 30 would be in the right-hand side of the cam slots 31 in respect to Figs. 1 and 4.

To set the clutch so that the shaft 15 and pulley 16 will be positively locked together and travel at the same speed, the lever 32 is pressed toward the handle 36 to cause the cam studs 30 to move in the cam slots 31 and thereby project the plunger 22 into a position in which the bell-crank levers 17 ride over the cam section 24 and onto the body of said plunger. When the clutch is thus set, there is no slippage between the shaft 15 and the wheel 17, and the driven member is being operated at its maximum speed.

By adjusting the plunger 22 so that its cam section 24 engages the bell-crank levers 17, the pressure exerted by said levers on the clutch plate 6 is such that there will be a slippage in the clutch so that the speed of the driven member is reduced. By setting the plunger with its cam section 24 in different axial adjustments on the bell-crank levers 17, the driven member may be operated at a variable speed.

What I claim is:

1. The combination with a revoluble member having a pair of axially spaced clutch plates, one of which is relatively axially adjustable and a wheel having a clutch hub journaled on said member, of clutch-actuating mechanism for setting the clutch plates onto the clutch hub under a variable pressure to permit variable slippage between said clutch plates and clutch hub, said clutch-actuating mechanism including a pair of bell-crank levers fulcrumed on said member for action on said movable clutch plate, a cam-acting plunger mounted on said member for operating said levers, a handle-equipped member swivelled on said revoluble member and having an internal cylindrical section and a pair of cam slots, a head swivelled on said plunger, rotatably mounted in said cylindrical section and having cam studs working in said cam slots, and a lever fulcrumed on said handle-equipped member and connected to said head for turning the same.

2. The combination with two revoluble members and a clutch for connecting the same, one of said members having an axially extended support, of a pair of bell-cranks pivoted to said extended support and operative on said clutch, a cam-acting member axially movable in said extended support and operative on said bell-cranks, a head swivelled on said extended support so that it will not rotate therewith, a lever pivoted to said head, and a connection between said lever and cam-acting member for setting the latter in different axial adjustments to thereby vary the frictional driving action of said clutch.

3. The combination with two revoluble members and a clutch for connecting the same, one of said members having an axially extended support, of a pair of bell-cranks pivoted to said extended support and operative on said clutch, a cam-acting member axially movable in said extended support and operative on said bell-cranks, a head swivelled on said extended support so that it will not rotate therewith, a lever pivoted to said head for movements in a plane approximately at right angles to the axis of said members, and a connection between said lever and cam-acting member including a cam device reacting against said head and operative to transform the pivotal movement of said lever into axial movement in said cam-acting member.

In testimony whereof I affix my signature.

FRANK H. BIERMAN.